(12) United States Patent
Young et al.

(10) Patent No.: US 9,045,027 B2
(45) Date of Patent: Jun. 2, 2015

(54) SEALING SYSTEM FOR SLIDE OUT ROOMS

(71) Applicant: JAEGER-UNITEK SEALING SOLUTIONS, INC., LaPorte, IN (US)

(72) Inventors: Raymond Young, Wanatah, IN (US); Marc Maloney, Mishawaka, IN (US); Roger Brown, LaPorte, IN (US); Makoto Sato, Bloomfield, MI (US)

(73) Assignee: Jaeger-Unitek Sealing Solutions, Inc., Laporte, IN (US)

( * ) Notice: Subject to any disclaimer, the term of this patent is extended or adjusted under 35 U.S.C. 154(b) by 0 days.

(21) Appl. No.: 13/646,013

(22) Filed: Oct. 5, 2012

(65) Prior Publication Data

US 2014/0097578 A1    Apr. 10, 2014

(51) Int. Cl.
*F16J 15/02* (2006.01)
*B60J 10/00* (2006.01)

(52) U.S. Cl.
CPC ............ *B60J 10/00* (2013.01); *F16J 15/027* (2013.01)

(58) Field of Classification Search
CPC .............................. F16J 15/0887; F16J 15/061
USPC .......... 277/644, 630, 637, 921; 296/165, 172, 296/173, 176, 26.13, 146.9; 49/498.1, 49/490.1
See application file for complete search history.

(56) References Cited

U.S. PATENT DOCUMENTS

| | | | | |
|---|---|---|---|---|
| 5,616,403 | A * | 4/1997 | Eckberg et al. | 428/215 |
| 6,158,171 | A * | 12/2000 | Kellogg et al. | 49/489.1 |
| 6,527,278 | B1 * | 3/2003 | Norris | 277/630 |
| 6,966,590 | B1 * | 11/2005 | Ksiezopolki et al. | 296/26.01 |
| 7,540,116 | B1 | 6/2009 | Martinson | |
| 7,614,677 | B2 * | 11/2009 | Ksiezopolski et al. | 296/26.09 |
| 7,651,144 | B2 | 1/2010 | Clark et al. | |
| D651,146 | S | 12/2011 | Schoonover et al. | |
| 8,701,351 | B2 * | 4/2014 | Siegel | 49/490.1 |
| 2006/0091687 | A1 * | 5/2006 | Schoffner et al. | 296/26.01 |
| 2009/0045649 | A1 * | 2/2009 | Eungard et al. | 296/186.4 |

* cited by examiner

*Primary Examiner* — Kristina Fulton
*Assistant Examiner* — Nathan Cumar

(57) ABSTRACT

A seal useful in sealing slide out rooms used in recreational vehicles. The seal may be used singularly or in pairs to straddle a wall through which the opening is located. A bulb is attached to the base in a cantilevered manner over the base. The bulb has an outer arcuate portion that is integrally joined to opposing sidewall portions. The sidewall portions extend into an inner wall that defines an enclosed space within the bulb portion. The bulb portion may also have a protrusion that can touch the base. A wiper extends from the base substantially co-linearly to the base and opposite the offsetting member. A locating leg extending from the base is movable between a first position and a second position. The first position has the locating leg perpendicular to the base and the second position places the locating leg parallel to the base.

13 Claims, 4 Drawing Sheets

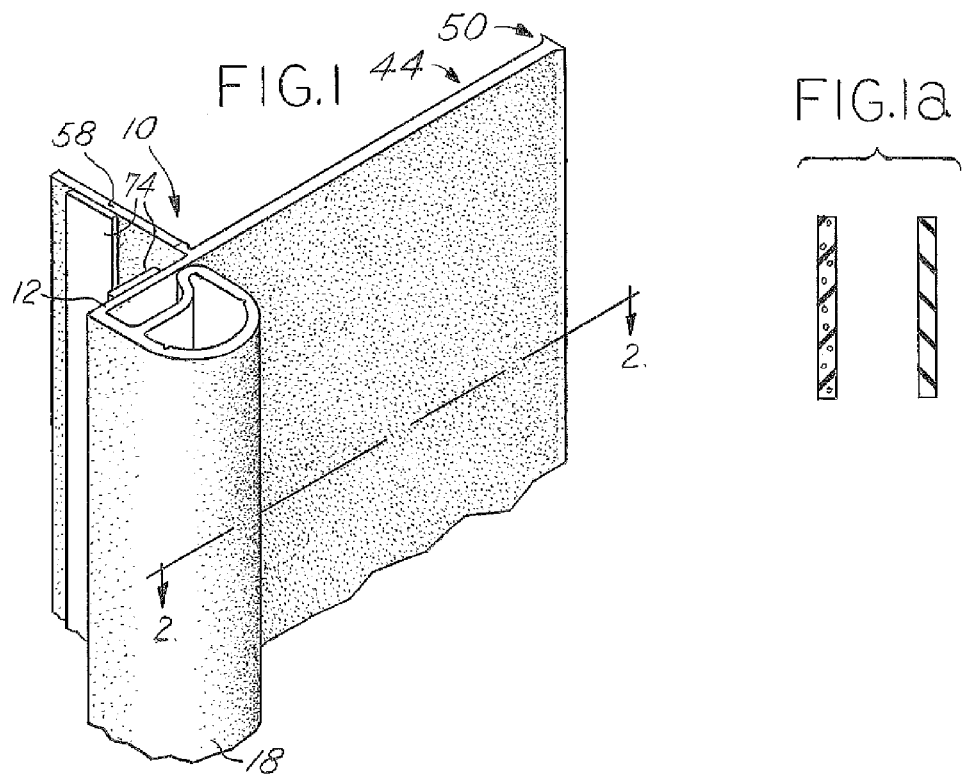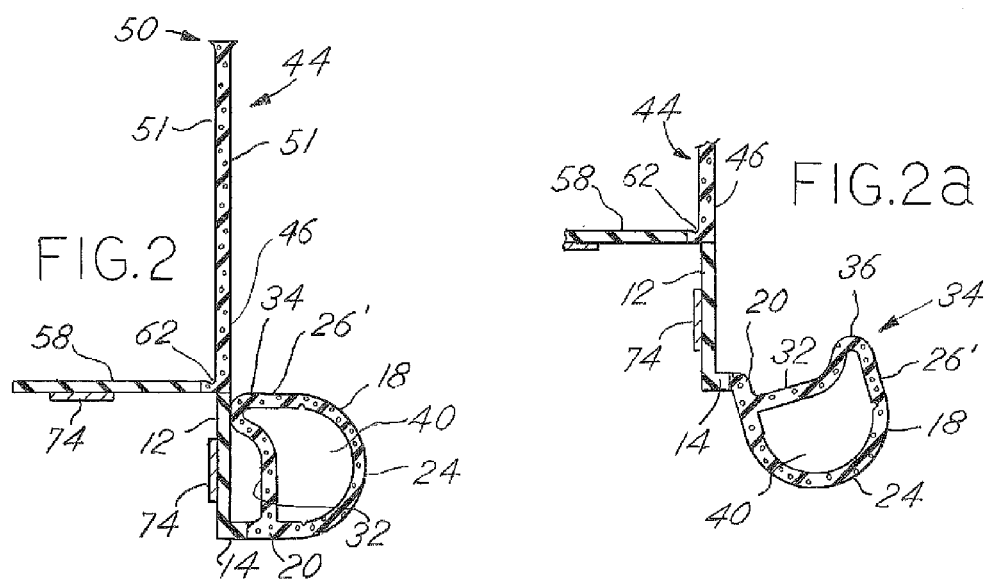

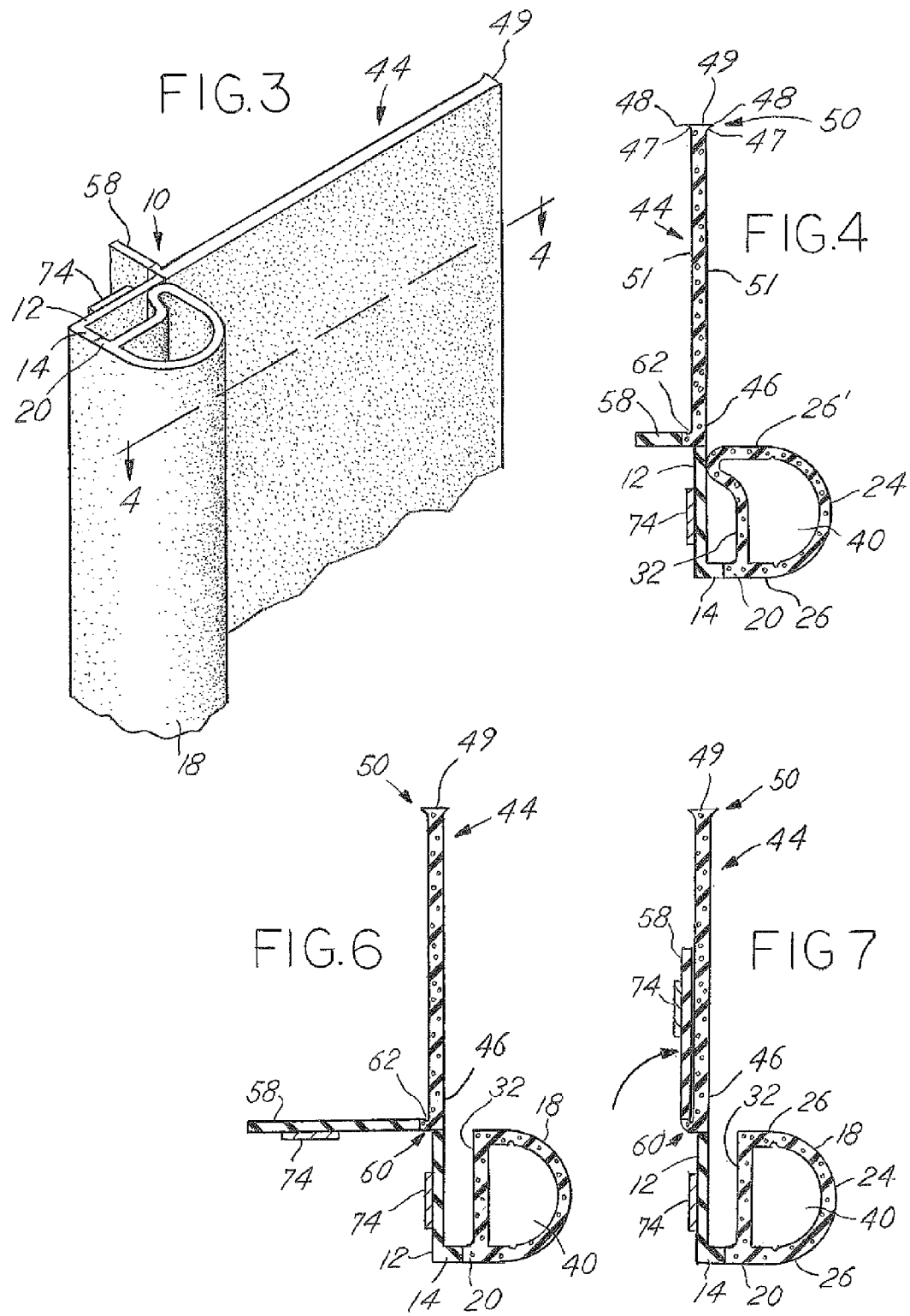

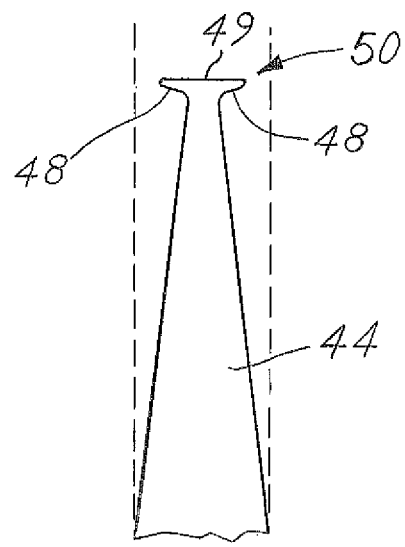
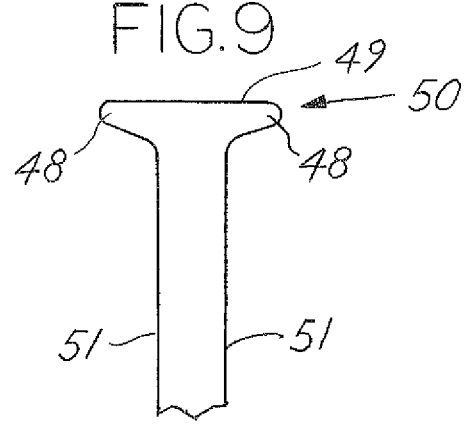

SEALING SYSTEM FOR SLIDE OUT ROOMS

BACKGROUND OF THE INVENTION

Seals for slide out rooms in recreational vehicles are typically cumbersome in their use and installation. This is due to several factors. First, the openings for slide out rooms are not standard in that the wall thickness is not always uniform. This often forces the use of many seals to cover various wall thicknesses. It is also possible that the walls are not perfectly even in their thickness. Shipping seals for slide out rooms can be difficult as well. Having a C-channel to straddle a recreational vehicle wall near the opening does not usually allow such a seal to be bent so it may be coiled for shipping. This forces such seals to be shipped in cut lengths. Thus, many seals for different widths may need to have cut lengths shipped. As can easily be imagined, this creates an inventory nightmare.

SUMMARY OF THE INVENTION

A seal that is particularly useful in sealing slide out rooms used in recreational vehicles. The seal may be used singularly or in pairs to straddle a wall through which the opening is located. The seal has a base that includes an offsetting member. The offsetting member is connected to a bulb portion. The bulb portion may have its own offsetting member that is joined to the offsetting member of the base. Each respective offsetting member is made of the same material as the part from which it extends. The bulb has an outer arcuate portion that is integrally joined to opposing sidewall portions. The sidewall portions extend into an inner wall that defines an enclosed space within the bulb portion. The bulb portion may also have a protrusion that can touch the base.

A wiper extends from the base substantially, co-linearly, to the base and opposite the offsetting member. The wiper has a proximal end and a distal end, with the proximal end being integrally joined to the base. A locating leg extends perpendicular to the base and has a distal end and a proximal end that is integrally joined to the base. The locating leg is movable between a first position and a second position. The first position has the locating leg perpendicular to the base and the second position places the locating leg parallel to the base.

BRIEF DESCRIPTION OF THE DRAWINGS

FIG. 1 is a perspective view of the seal;
FIG. 1A is a material sample showing low durometer material on the left and high durometer material on the right;
FIG. 2 is a sectional view of the seal as taken along line 2-2 in FIG. 1 indicating high and low durometer areas of the seal;
FIG. 2A is a sectional view of the seal like that shown in FIG. 2 showing the seal in its second position with the bulb bent away from the base;
FIG. 3 is a perspective view of the seal;
FIG. 4 is a sectional view of the seal as taken along line 4-4 in FIG. 3;
FIG. 6 is a sectional view of a different embodiment of the seal lacking a protrusion;
FIG. 7 shows the seal in FIG. 6 with the locating leg in its second position.
FIG. 8 shows a tapered wiper with flared tip;
and
FIG. 9 shows a magnified view of the flared tip

DETAILED DESCRIPTION OF INVENTION

Figure 5:
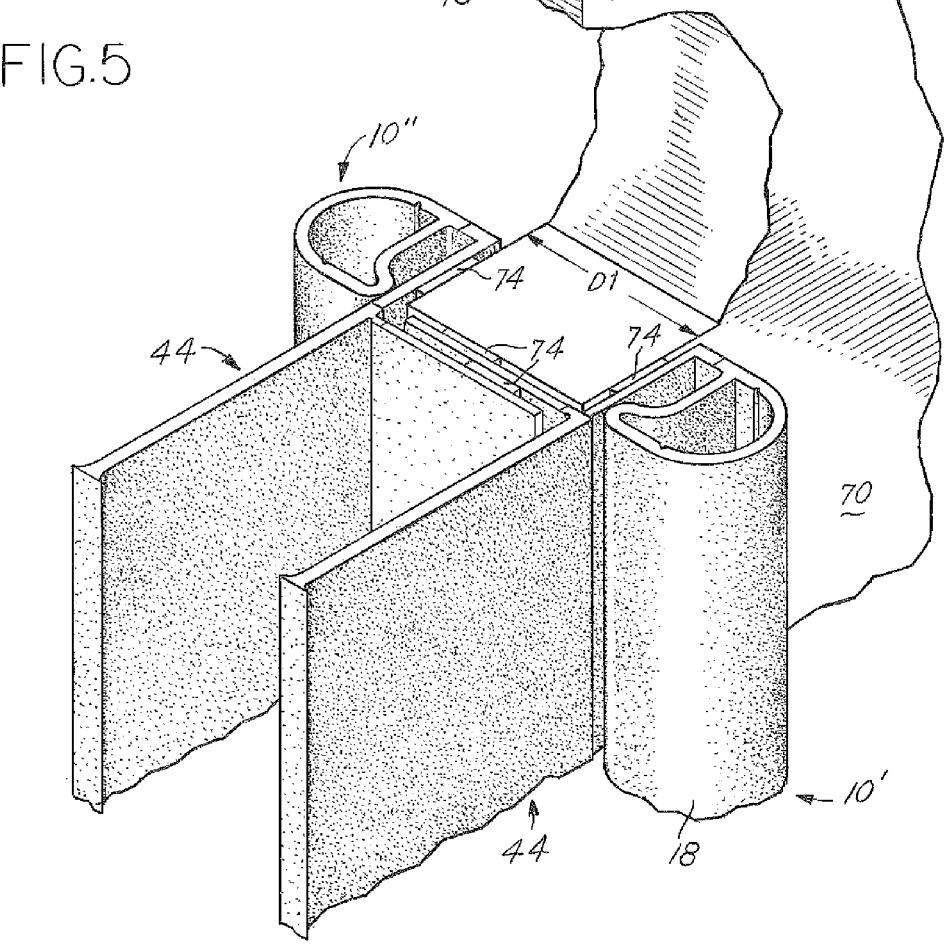
FIG. 5 is a view of two seals as shown in FIG. 1 in their installed position in an opening in a recreational vehicle wall.

FIG. 1 shows the seal 10 of this invention in perspective. This seal is particularly useful in the sealing of slide out rooms used in recreational vehicles, and FIG. 5, shows how the seal 10 is installed for such a purpose. The seal 10 includes a base 12 that has a first offsetting member 14 extending from it to form an L-shape. The base 10 is a relatively high durometer material compared to the rest of the seal, and while resilient to some degree it is substantially less flexible than other parts of the seal 10. The base 12 is made of a material of approximately 90 shore A.

The first offsetting member 14 extends perpendicularly from the base 12 toward a bulb portion 18. The bulb portion 18 has a second offsetting member 20 that extends toward the first offsetting member 14 and is integrally joined with it. The first and second offsetting members' combined length span the distance between the base 12 and bulb portion 18. The bulb portion 18 is made of a material that is a lower durometer than the base 12. The bulb portion 18 and its second offsetting member 20 are made of a material that is approximately 35 shore A. The bulb portion 18 has an outer arcuate portion 24 that is joined to opposing sidewalls 26. The sidewalls 26 extend into an inner wall 32. As shown in FIGS. 6 and 7, the bulb portion 18 has a flat inner wall 32 that is parallel to the base 12. The inner wall 32 may also include a protrusion 34 as shown in FIG. 4. The embodiment of FIG. 4 has sidewall 26' being longer than the other sidewall 26. Because the sidewall 26' is longer than sidewall 26 the protrusion 34 includes an arcuate terminal end 36 that transitions integrally into the inner wall 32. In this way, the inner cavity 40 of the bulb portion 18 continues into the protrusion. The use of the same wall thickness in the protrusion 34, sidewalls 26, 26', and inner wall 32 allows the entire bulb portion 18 to be readily deformable when pressed against the base 12.

A wiper 44 extends co-linearly from the base 12 and is integrally joined at a proximal end 46. A distal end 49 is cantilevered with respect to the proximal end 46. The wiper 44 has lateral sides 51 that are substantially parallel and the distal end 49 includes a flared tip 50. It is also contemplated that the lateral sides may in some cases not be parallel if non-uniform cross sections are desired. For instance, a taper narrowing toward the distal may be used, as shown in FIG. 8. As seen in FIG. 4, the flared tip 50 is wider than the rest of the wiper 44 and has two arcs 47 that transition into opposing corners 48 that define the maximum width of the flared tip 50. FIG. 9 shows the corners 48 in detail. The corners can be radiused as shown in FIG. 9 or can be sharp corners. The end of the flared tip 50 of FIG. 4 is perpendicular to the lateral sides 51. It may be possible that the flared tip 50 is not the widest part of the wiper 44 and this is shown in FIG. 8. In this case, the wiper 44 tapers toward the distal end 49 until widening at the flared tip 50. In the embodiments shown in FIGS. 4, 5, 8 and 9, the flared tip 50 is wider than the portion of the wiper 44 adjacent to the tip. The wiper 44 is made of a lower durometer material than that of the base 12. The wiper 44 material is approximately 35 shore A hardness. As such, even though the wiper 44 and base 12 have roughly the same thickness, the wiper 44 is substantially more flexible than the base 12. The different durometer materials used in the seal 10 are shown in FIG. 1A. The hatching shown on the left side in FIG. A corresponds to the areas of lower durometer material, and the higher durometer material of the base 12 is shown on the right hand side of FIG. 1A. The locations of the different materials are shown in FIGS. 2 and 2A. The seal 10 is coextruded so the transitions between materials are integrally joined. The locations of the lower and higher durometer materials are placed to provide predictable bending of the seal 10. The offsetting members 14, 20 provide a combined distance allowing for the bulb portion 18 to have a first position, shown in FIG. 2, where the inner wall 32 is spaced parallel to the base 12 a distance equal to the combined distance. The protrusion 34 in this first position touches the base 12 at its terminal end 36 in this first position. In some cases it may be desirable that the combined distance of the offsetting members 14, 20 be greater than the protrusion 34 so the terminal end 36 does not touch the base 12 in the first position. The seal 10 of FIGS. 2 and 2A in its first position completely encloses and covers the base 12. The resiliency of the offsetting members 14, 20 bias the cantilevered bulb portion 18 into the first position shown in FIG. 2. The offsetting members 14, 20 provide predictable bending that allows the bulb portion 18 to be bent into a second position shown in FIG. 2A. The second offsetting member 20 being of a softer durometer yields to provide a bendable hinge while the first offsetting member 14 does not move. The single connection to the bulb portion 18 to the base through the offsetting members 14, 20 provides a sufficient gap between the inner wall 32 and base 12 to accommodate fasteners that may be driven through the base 12.

A locating leg 58 extends perpendicularly with respect to the base 12 and is joined with a hinge 60 where the proximal end 46 of the wiper 44 joins the base. The entire locating leg 58 is farther from the offsetting members 14, 20 than the outermost portion of the sidewall 26, 26' nearest the wiper 44. Therefore, the entire bulb portion 18 is between the outermost portion of the offsetting members 14, 20 and the surface of the locating leg 58 facing the offsetting members 14, 20. The locating leg 58 is made from the same durometer material as the base as can be seen by the sectioning in FIGS. 2, 2A, 4, 6 and 7. As shown in FIG. 6 the locating leg 58 is in its first position, perpendicular to the base 12. The locating leg 58 has a single hinge 60 that consists of a single thinned section 62 that is on the same side of the leg 58 as the wiper 44. The thinned section 62 being in that location places the score that defines the thinned section 62 on the folding side of the leg 58 when the leg is folded into its second position shown in FIG. 7. The second position in FIG. 7, in which the leg 58 is folded adjacent to the wiper 44, is particularly important for transportation of the seal 10 before it is installed. As can be seen in FIG. 7, the highest durometer portions of the seal, being the base 12 and locating leg 58, are nearly aligned. This provides a very low moment of inertia with respect to the high durometer portions of the seal 10 so that it may be easily bent about a neutral axis that would correspond to a line between the base 12 and locating leg 58 in its second position. Because of the shape of the seal 10 in its second position, it can easily be coiled so that desired lengths may be cut from a much larger roll of the seal 10.

Installation of the seal 10 in its intended use is shown in FIG. 5. Wall 70 is a typical recreational vehicle sidewall that receives a slide out room that is not shown. The wall 70 has a thickness D1 that can vary between different manufacturers or different models of recreational vehicles. The wipers 44 extend inwardly into the opening 71 and rub against a sidewall of the slide out room to form a seal. The opening 71 includes a transverse surface 73 that extends between an inner surface 75 and an outer surface 77. Because of the high friction that may be encountered on the wipers 44, an anti-friction coating may be applied to the surface near the flared tips 50. The coating is between 0.002 and 0.010 inches and has a durometer of 40-90 shore D. The coating is a thermoplastic vulcanizate (TPV) that has flexibility in spite of its hardness. This will allow the corners 48 of the tip 50 to conform to the sidewall of the slide out room and be resistant to abrasion. In addition to providing a low friction surface, the coating provides a surface that will not adhere to the surfaces it contacts. This is an important property for the arcuate portions 24 of the bulb portions 18 because the flanges of the slide out room will be compressed against the arcuate portions 24 then the slide out room is extended or retracted. During times of extreme heat this could cause lower durometer materials to stick to a flange on the slide out and the coating prevents adhesion of the bulb portions 18 to the flanges.

Installation of the seal is done by using adhesive tape 74 to secure the seal 10 in place. A first seal 10' is installed into the opening 71 with its leg 58 in the first position. The double sided adhesive tape strips 74 hold the seal in place as shown in FIG. 5. Additionally, screws may be driven through the base 12 into wall 70 for additional security in retaining the seal 10' in its desired location. This is done by bending the bulb portion 18 to its second position and then letting the bulb portion 18 snap back into its first position. This will conceal screws driven into the base 12. A second seal 10" is placed oppositely of the first seal 10' so that its leg 58 overlaps the leg 58 of the first seal 10' and its base is pressed against the wall 70. As FIG. 5 shows the seals 10' and 10" form a system of sealing that provides two wipers 44, which then form a watertight connection to the wall 70 on both sides as well as a watertight connection between the overlapping legs 58. The overlapping legs 58 of the system allow the seals 10' and 10" to conform to many different wall thicknesses D1. Each seal 10' and 10" has the same cross section, thus, it is possible to have a single roll of the seal 10, cut it to the desired length, and use a piece of the same roll for both sides of the wall 70. The likelihood of a watertight seal for the slide out room is better with the present system due to the simplicity of installation and the elimination of confusion that arises from using different fixed width seals for different wall thicknesses.

Also, the coating near distal ends 49 of the wipers 44 reduce friction against the slide out room being sealed. As such, using the seals 10 of the present invention allows for using smaller motors to extend and retract the room. The coating on the bulb portions 18 of the seals 10 prevents the flanges from sticking and causing actuating motors to strain, to break the flange from prior art seals. Thus, wear is saved on both electrical components and mechanical components because sudden current surges will not drawn by overworked motors.

The present invention is not limited to the details given above, but may be modified within the scope of the following claims.

What is claimed is:
1. A elongate monolithic seal comprising:
a base;
a bulb portion being joined to said base, said bulb portion having an outer arcuate portion integrally joined to opposing sidewall portions, said sidewall portions integrally joined to an inner wall to define an enclosed interior and an exterior of said bulb portion, said bulb being joined to said base by an offsetting member extending between said inner wall and said base, said offsetting member having a first hinge, said offsetting member extending between said base and said bulb portion at its inner wall, said bulb portion being made from a durometer of material lower than that of said base, said bulb portion being movable by said first hinge between a first position in which said inner wall is substantially parallel to and spaced from said base, and a second position in which said bulb portion is bent away from said base so that said inner wall is spaced farther from said base than in said first position;
a wiper extending substantially co-linearly from said base opposite said offsetting member, said wiper having a proximal end integrally joined to said base and a distal end opposite said proximal end; and a locating leg extending substantially perpendicular to said base having a distal end and a proximal end integrally joined to said base by a second hinge located at said proximal end joined to said base, said locating leg being rotatably movable by said second hinge between a first position being substantially perpendicular to said base and a second position substantially parallel to said base, said second hinge and said wiper being composed of a material having a lower durometer than said base.

2. The elongate seal as claimed in claim 1, wherein said wiper includes a flared tip at said distal end being wider than a portion of said wiper adjacent to said flared tip.

3. The elongate seal as claimed in claim 2, wherein said distal end of said wiper is substantially perpendicular to lateral sides of said wiper, said flared tip including arcuate portions extending from said lateral sides to a maximum width of said flared tip.

4. The elongate seal as claimed in claim 3, wherein said arcuate portions on said flared tip meet said distal end to define corners at said maximum width of said flared tip.

5. The elongate seal as claimed in claim 1, wherein said bulb portion includes a protrusion extending toward said base opposite said offsetting member and said bulb portion includes a second offsetting member, said offsetting member from said base being a first offsetting member, said first and second offsetting members being integrally joined and co-linear to offset said inner wall from said base by a distance defined by their combined length, said protrusion extending a distance from said inner wall so that said protrusion is nearer said base than said inner wall when said bulb portion is in its said first position.

6. The elongate seal as claimed in claim 5, wherein said wiper includes a flared tip at said distal end being wider than a portion of said wiper adjacent to said flared tip.

7. The elongate seal as claimed in claim 6, wherein said distal end of said wiper is substantially perpendicular to lateral sides of said wiper, said flared tip including arcuate portions extending from said lateral sides to a maximum width of said flared tip.

8. The elongate seal as claimed in claim 7, wherein said arcuate portions on said flared tip meet said distal end to define corners at said maximum width of said flared tip.

9. A sealing system for sealing slide out rooms comprising:
a first monolithic seal including a bulb portion being joined to said base, said bulb portion having an outer arcuate portion joined to opposing sidewall portions, said sidewall portions integrally joined to an inner wall to define an enclosed interior and an exterior of said bulb portion, said bulb bring joined to said base by an offsetting member having a first hinge, said offsetting member extending between said base and said bulb portion at its inner wall, said bulb portion being made from a durometer of material lower than that of said base, said bulb portion being movable by said first hinge between a first position in which said inner wall is substantially parallel to and spaced from said base, and a second position in which said bulb portion is bent away from said base so that said inner wall is spaced farther from said base than in said first position, a wiper extending substantially co-linearly from said base opposite said offsetting member, said wiper having a proximal end integrally joined to said base and a distal end opposite said proximal end, a locating leg extending substantially perpendicular to said base and having a distal end and a proximal end integrally joined to said base by a second hinge located at said proximal end joined to said base, said locating leg being rotatably movable by said second hinge between a first position being substantially perpendicular to said base and a second position substantially parallel to said base, said second hinge and said wiper being composed of a material having a lower durometer than said base;

a second monolithic seal including a bulb portion being joined to said base, said bulb portion having an outer arcuate portion joined to opposing sidewall portions, said sidewall portions integrally joined to an inner wall to define an enclosed interior and an exterior of said bulb portion, said bulb bring joined to said base by an offsetting member having a first hinge, said offsetting member extending between said base and said bulb portion at its inner wall, said bulb portion being made from a durometer of material lower than that of said base, said bulb portion being movable by said first hinge between a first position in which said inner wall is substantially parallel to and spaced from said base, and a second position in which said bulb portion is bent away from said base so that said inner wall is spaced farther from said base than in said first position, a wiper extending substantially colinearly from said base opposite said offsetting member, said wiper having a proximal end integrally joined to said base and a distal end opposite said proximal end, a locating leg extending substantially perpendicular to said base and having a distal end and a proximal end integrally joined to said base by a second hinge located at said proximal end joined to said base, said locating leg being rotatably movable by said second hinge between a first position being substantially perpendicular to said base and a second position substantially parallel to said base, said second hinge and said wiper being composed of a material having a lower durometer than said base; and said locating legs adapted for overlapping contact in an opening in a wall adjacent to and overlying a transverse surface so that said bases of said first and second seals may be mounted to said wall on inner and outer surfaces adjacent to said opening when said legs overlap across said transverse surface.

10. The sealing system as claimed in claim 9, wherein said wipers include flared tips and said distal end being wider than a portion of said wiper adjacent to said flared tip.

11. The sealing system as claimed in claim 10, wherein said distal end of said wiper is substantially perpendicular to lateral sides of said wiper, said flared tip including arcuate portions extending from said lateral sides to a maximum width of said flared tip.

12. The sealing system as claimed in claim 11, wherein said arcuate portions on said flared tips meet said distal ends to define corners at said maximum width of said flared tips.

13. The elongate seal as claimed in claim 12, wherein said bulb portions include a protrusion extending toward said bases opposite said offsetting members and said bulb portions include second offsetting members, said offsetting members from said bases being first offsetting members, said first and second offsetting members being integrally joined to offset said inner walls from their corresponding bases by a distance defined by their combined length, said protrusions extending a distance from said inner walls so that said protrusion is nearer said base than said inner wall when said bulb portion is in its said first position.

* * * * *